United States Patent [19]

Carson et al.

[11] Patent Number: 4,560,837

[45] Date of Patent: Dec. 24, 1985

[54] CALL TRANSFER METHOD AND CIRCUITRY

[75] Inventors: Robert A. Carson, Indianapolis, Ind.; Francis M. Fenton; David F. Jones, both of Middletown, N.J.

[73] Assignee: AT&T Information Systems Inc., Holmdel, N.J.

[21] Appl. No.: 523,092

[22] Filed: Aug. 15, 1983

[51] Int. Cl.$^4$ .......................... H04M 3/58; H04Q 1/30
[52] U.S. Cl. .......................... 179/18 BD; 179/99 LS
[58] Field of Search ............. 179/18 BD, 99 P, 99 M, 179/99 R, 99 LS

[56] References Cited

U.S. PATENT DOCUMENTS

| | | | |
|---|---|---|---|
| 3,665,112 | 5/1972 | Blake et al. | 179/99 R |
| 3,800,098 | 3/1974 | Evans et al. | 179/99 R |
| 4,338,495 | 7/1982 | Bloch et al. | 179/99 M |

FOREIGN PATENT DOCUMENTS

| | | | |
|---|---|---|---|
| 60153 | 5/1981 | Japan | 179/18 BD |
| 65953 | 4/1982 | Japan | 179/18 BD |

OTHER PUBLICATIONS

"Horizon ® Communication System: Custom Service for Small Businesses", *Bell Laboratories Record*, vol. 55, No. 10, Nov. 1977, pp. 271-275.

*Primary Examiner*—Thomas W. Brown
*Attorney, Agent, or Firm*—John A. Caccuro

[57] ABSTRACT

In the disclosed call transfer method and circuitry, audibly distinguishable ringing signals at a station set enable an answering party to determine whether a received call is either the original call or a previously answered call. Line status LEDs at each station set give specific visual indications to trace the progress of a call transfer.

11 Claims, 9 Drawing Figures

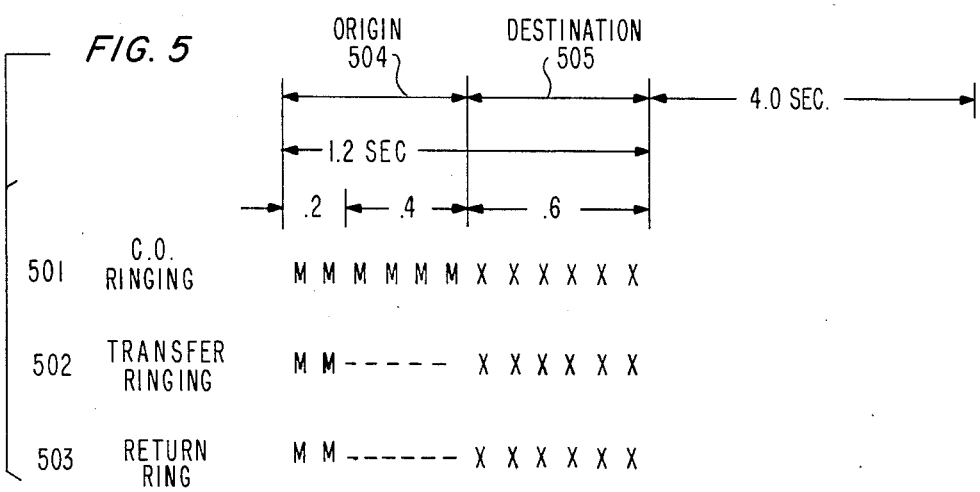

CALL TRANSFER METHOD AND CIRCUITRY

TECHNICAL FIELD

This invention relates to telephone communication systems and, more particularly, to a method and circuitry for providing a call transfer capability therein.

BACKGROUND OF THE INVENTION

It is known that telephone callers get upset when their call is transferred and the call transferee party answers the call in the same manner as the original answering party, since the caller then has to repeat to the transferee party the information given to the original answering party. This problem does not exist in large PBX systems which typically have an attendant who properly answers the outside call, e.g., "XYZ Company", and then signals the internal called party who would then answer in their own name, e.g., "Mr. Smith". However, small communication systems (e.g., key systems) normally do not have the luxury of an attendant and thus every telephone location is a potential attendant position. Thus, a problem arises since an answering party does not know if the call is an original received call or a previously answered and transferred call and hence does not know how to properly answer the call.

SUMMARY OF THE INVENTION

The above problem is solved according to the present invention by providing a distinguishable audible ring signal to indicate the transfer of a previously answered call. The transfer call ring signal is audibly distinguishable from the original received call ring signal. Moreover, if the call is not answered by the transferee party within a predetermined time period the transferor's telephone rings with the distinguishable audible ring signal. Hence, from the type of ring signal either the transferor or transferee party knows that this call was previously answered. Moreover, a line status light-emitting-diode LED at each station set gives specific visual indication to trace the progress of the call transfer.

BRIEF DESCRIPTION OF THE DRAWING

The detailed description of the invention will be more fully appreciated from the illustrative embodiment shown in the drawing, in which:

FIG. 4 shows the visual and audible signals at various station sets during the various operating states of the present invention;

FIG. 5 shows a detail of the various ringing signal formats used with the present invention;

DETAILED DESCRIPTION

Before describing the present invention, it may be helpful to generally describe the operation of a telephone communication system in which the claimed call transfer feature can be utilized. It should be recognized that this feature can be utilized in other similar type communication systems. Since such systems utilize a variety of hardware and programming techniques, no attempt is made to detail the entire program used to control the communication system. However, the disclosed call transfer feature must be blended into the overall structure of the system in which it is used and must be tailored to mesh with other features and operations of the system. Thus, in order to avoid confusion and in order to enable those skilled in the art to practice the claimed invention, this specification will describe the operation of the call transfer feature using flow charts which describe the logical steps and the various parameters required to implement the invention.

Figure 1:
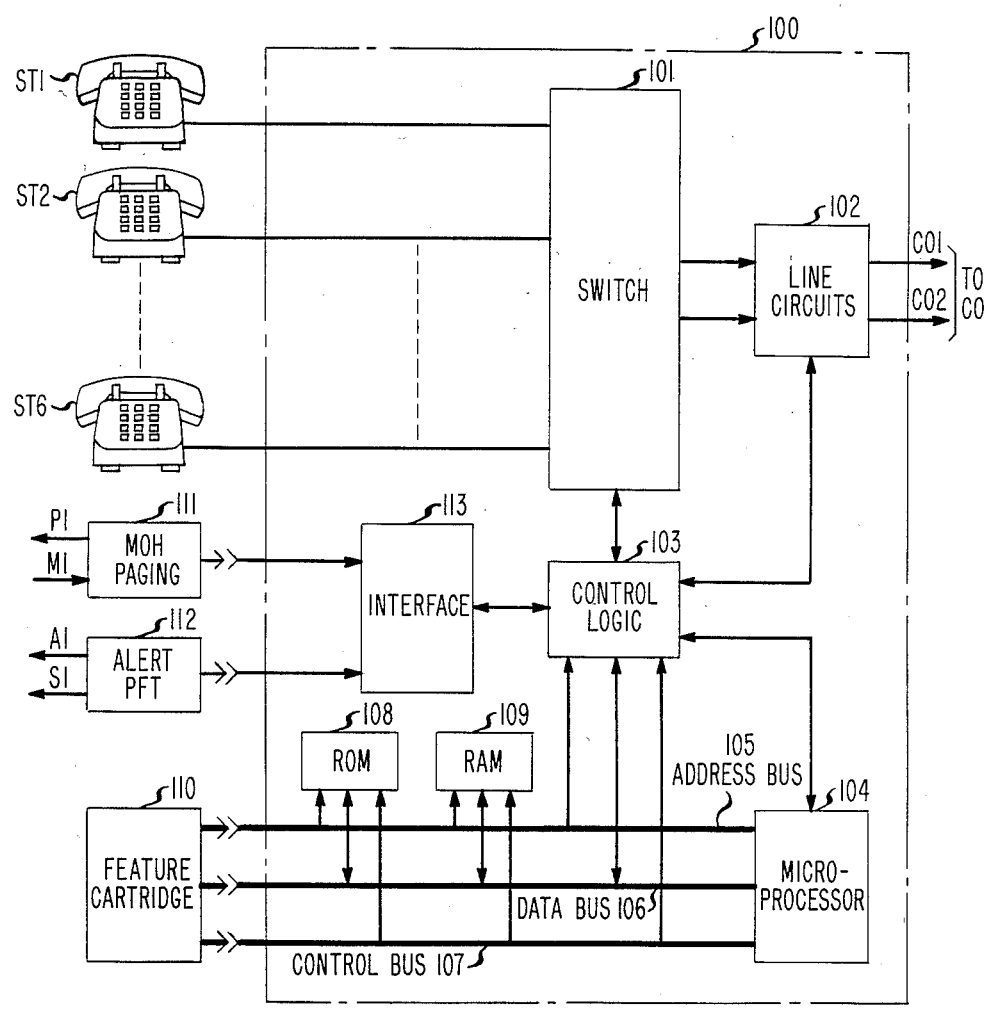
FIG. 1 is a block diagram of a communication system utilizing the invention.

FIG. 1 shows a block diagram of a communication system useful in describing the present invention. The communication system of FIG. 1 accommodates up to six telephone lines connected to station sets, ST1-ST6, and two central office (CO) lines, CO1 and CO2, which connect to common controller 100. Common controller 100 has three user accessible cartridge locations for inserting optional cartridges 110, 111 and 112.

Figure 2:
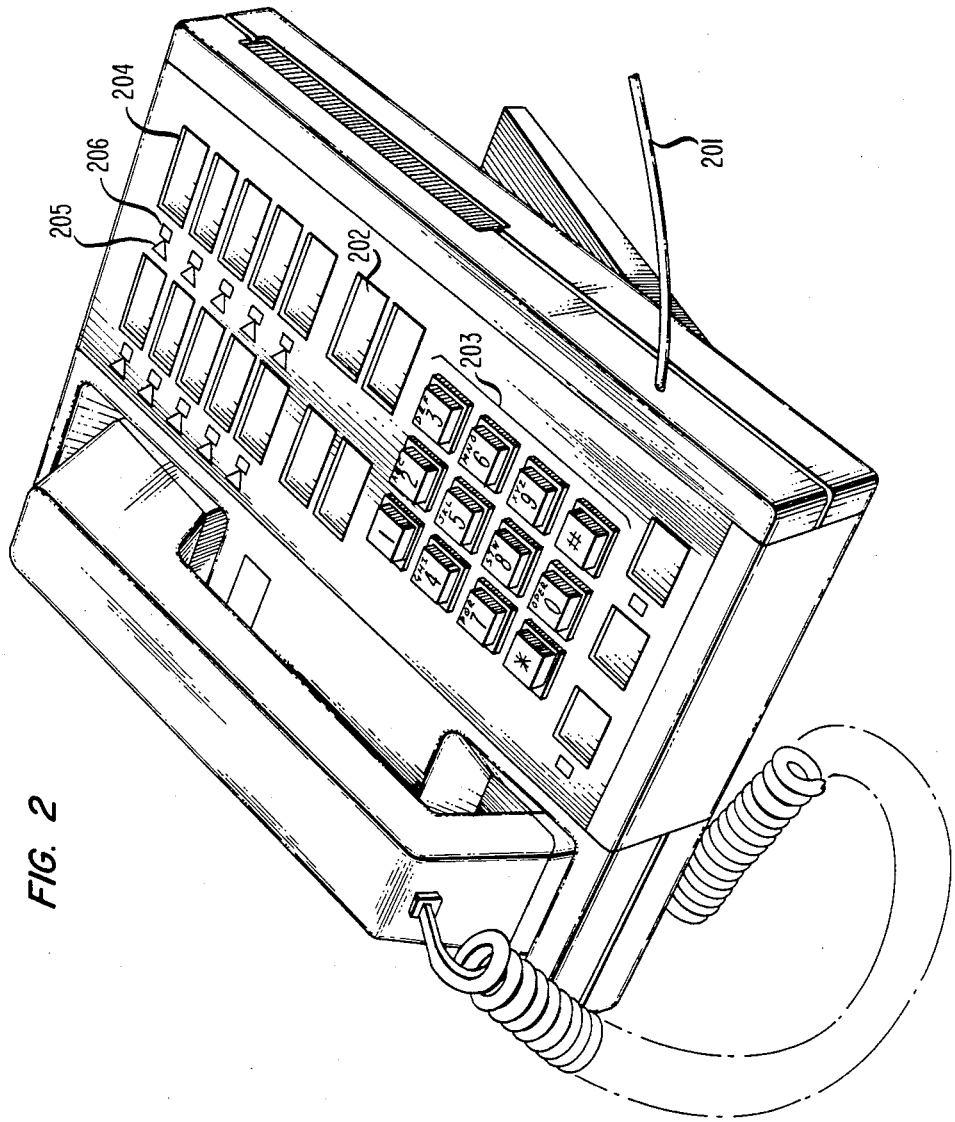
FIG. 2 is a station set used with the communication system of FIG. 1.

FIG. 2 shows a typical station set for use with the communication system shown in FIG. 1. The station set is connected to common controller by a 4 pair cable 201. Two of the pairs provide two voice channels, one pair provides for station set power, and one pair provides control signals. The station set signaling over the control pair is described in copending U.S. patent application Ser. No. 443,392, filed by T. H. Judd on Nov. 22, 1982 now U.S. Pat. No. 4,454,383. The station set includes a call transfer button 202 used to initiate the disclosed call transfer feature. The key pad 203 provides dialing capability for the station set. A typical CO line appearance is shown at location 204 and includes a red light-emitting-diode (LED) 205 and a green LED 206. It is contemplated that call transfer button 202 and LEDs 205 and 206 could be included as part of an adjunct associated with each station set without deviating from the teaching of the present invention. Since the operation of the other buttons and LEDs of the station set are not relevant to the disclosed invention they are not described herein.

Returning to FIG. 1, it should be noted that while the embodiment of the hardware shown in FIG. 1 represents an embodiment, the described invention can be utilized in many other program controlled communication systems. Common controller 100 establishes and controls all intercom and central office communications involving the station sets. Controller 100 includes switch 101 which operates in response to signals from control logic circuit 103 to establish a communication connection between station sets ST1–ST6 and CO lines CO1 and CO2, via line circuits 102.

Control logic circuit 103 provides in a wellknown manner various system timers, programmable tone generators, network control logic, and signals for selecting and controlling system communication connections in response to commands received from microprocessor 104. Microprocessor (CPU) 104 is connected via address bus 105, data bus 106 and control bus 107 to program cartridge 101, read-only-memory (ROM) 108, random-access-memory (RAM) 109 and control logic 102.

Additionally, common controller 100 has three user accessible cartridge locations for inserting optional cartridges 110, 111 and 112. User interchangeable programmed memory cartridge 110 connects to controller 100 via busses 105, 106 and 107 to provide program instructions for controlling the operation of various optional system features. User interchangeable hardware cartridge 111 provides the system with a music-on-hold capability utilizing an externally provided music source connected to input M1 and a system paging capability via paging output P1. User interchangeable hardware cartridge 112 provides the system with both a power failure transfer (PFT) and external alert capability. Hardware cartridges 111 and 112 are connected to controller 100 via an interface unit 113 which is controlled by control logic 103. The embodiment of the above communication system, which utilizes interchangeable program cartridge 110 and hardware cartridges 111 and 112 is described in the copending U.S. patent application Ser. No. 445,982, filed by Bennett et al on Dec. 1, 1982 now U.S. Pat. No. 4,506,346.

It should be noted that microprocessor 104 receives program instructions from ROM 108 and/or program cartridge 110 to perform in a well-known manner the features and functions of the communication system. Memory, RAM 109, is utilized for storing and accessing user generated data associated with performing the desired function programmed in ROM 108.

In the disclosed embodiment ROM 108 and RAM 109 provide, respectively, the program memory and temporary memory required for performing the basic system communication functions. Additional or optional features and functions of the communication system are programmed in a user interchangeable program cartridge 110. Program cartridge 110 consists of additional ROM and RAM for storing program instructions and temporary data associated with these new features and functions. As will be described in a later paragraph, the connection of program cartridge 110 replaces part of ROM 108 and/or RAM 109 to implement the call transfer features and/or functions in the communication system.

Figure 3:
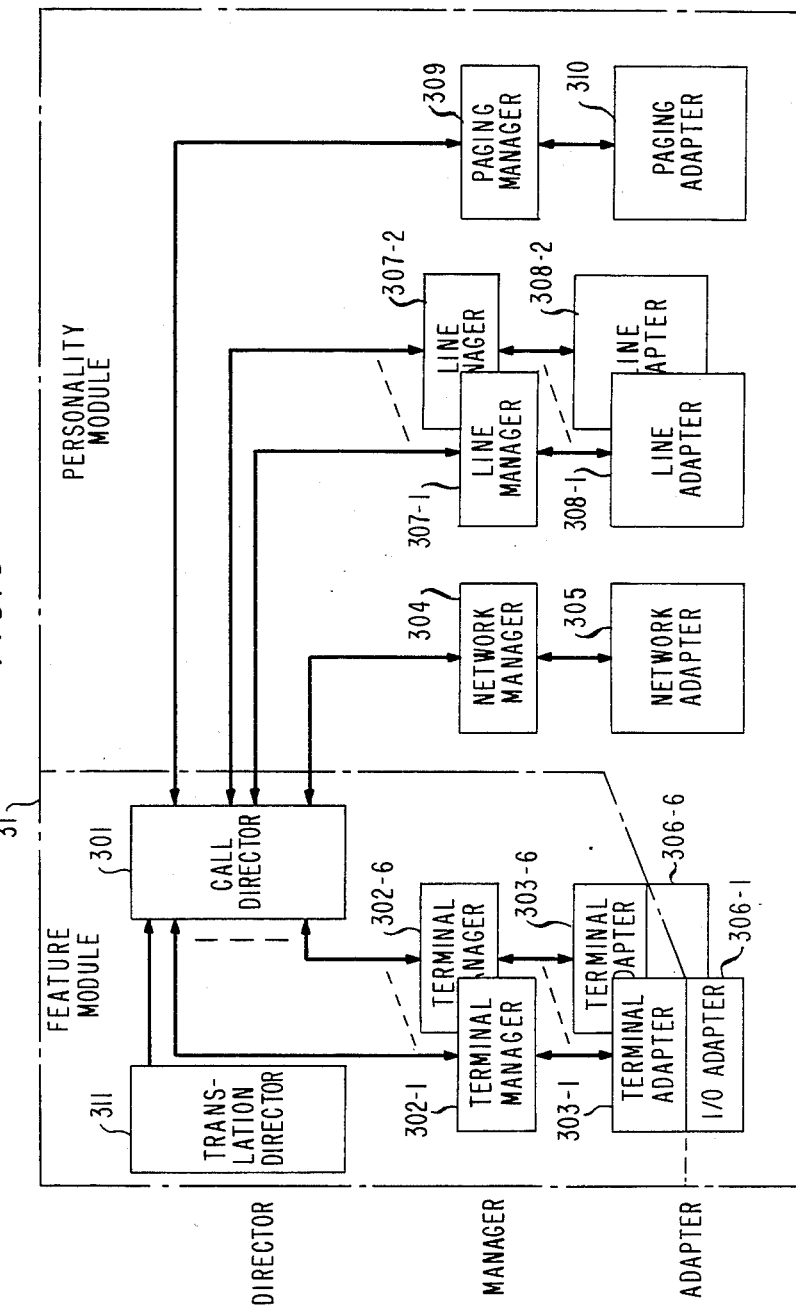
FIG. 3 is a block diagram of the software architecture of the communication system of FIG. 1.

FIG. 3 shows an embodiment of the software architecture utilized in the system shown in FIG. 1. To facilitate the addition of or changes to system operating features, the system is partitioned into a feature program (FP) module 31 and a personality program (PP) module 32. When the communication system shown in FIG. 1 does not contain the optional feature cartridge 110, both the feature program and personality program reside in ROM 108. When the optional features are desired, the appropriate program cartridge 110 is connected to controller 100 to add to or replace feature programs located in ROM 108, as described in the above-referenced Bennett et al patent application.

A communication method is disclosed in the copending U.S. patent application Ser. No. 448,739, filed by J. Crupi et al on Dec. 10, 1982, which enables programs resident on the personality module to call programs resident on the feature module, whether located on ROM 108 or feature cartridge 110, without knowing the addresses of those programs. This protocol permits a variety of feature programs located on different feature cartridges to be utilized with the communication system by merely the substitution of feature cartridges.

The following paragraphs provide a background for understanding the disclosed call transfer feature operation in the embodiment of the software architecture block diagram shown in FIG. 3. The software block diagram of FIG. 3 shows the feature program as including call director 301, translation director 311, a group of terminal managers 302-1 through 302-6, and the terminal feature dependent parts of the group of terminal adapters 303-1 through 303-6. The disclosed embodiment requires one terminal manager and terminal adapter per station set ST1-ST6 of FIG. 1. In FIG. 3, the personality program includes network manager 304, network adapter 305, line managers 207-1 and 207-2, line adapters 308-1 and 308-2, paging manager 309, paging adapter 310 and the input/output portion of the terminal adapters 306-1 through 306-6. These blocks or modules of the personality program are hardware dependent modules, also known as hardware driver programs, which interface the system to the specific hardware.

Network adapter 305 is responsible for receiving hardware status and transmitting hardware stimuli to switch network 101. The network adapter decodes requests, updated network hardware status, and generates call progress tones. The network adapter converts the raw hardware dependent variables into a hardware independent language for communication to network manager 304. Thus, network adapter 305 translates specific hardware signals to and from functional language commands to make or clear connections to specified ports or links of the network.

Line adapter 308 scans the CO lines for changes in the state of the CO lines (CO1 and CO2) and reports any changes in a hardware independent language to line manager 307. Line adapter 208 receives commands from line manager 207 which are decoded and executed in hardware dependent language. Thus, the line adapter generates and receives hardware signals which enable the system to perform the standard CO line functions such as conferencing, queuing, dialing, disconnection, holding, outpulsing, recalling, seizing and tone signaling.

Similarly, paging adapter 310 receives and outputs hardware stimuli to interface to various paging devices. Paging manager 309 receives and transmits device independent commands to control paging adapter 310.

The communications between the network manager 304, terminal managers 302-1 through 302-6, line manager 307, paging manager 309, call director 301, and translation director 311 utilize well-known program calls or commands which identify the program to be called to perform the requested function. The program call also includes the various arguments which specify the parameters necessary to carry out the function. Thus, the appropriate arguments such as the call identification, CID, station, ID, CO line, FID, resource, MOH, status, ST, etc. are included with each program call.

Since in the disclosed system any of a variety of feature program cartridges may be connected to the system, the absolute addresses of programs located on the feature cartridge are not likely to remain the same on different feature cartridges. The communication method disclosed in the above-identified Crupi et al application enables hardware dependent programs located on the personality program to locate and communicate with programs resident on any of the feature cartridges. Moreover, since the feature cartride is completely isolated from hardware dependent code, any hardware changes in the controller can be compensated for by changes only in the appropriate programs of the personality program and require no changes to the feature program cartridges. Note, if the feature program were designed not to be interchangeable with other feature programs, the programs of the pesonality progam would be programmed with the absolute addresses of all programs of the system.

While the disclosed embodiment of the system includes the software architecture shown in FIG. 3 which uses a separate feature program and personality program, the disclosed invention is more clearly understood if we assume for this part of the description, that the system is constructed with the absolute address of each program being known to all other programs of the system. In such an arrangement, program calls would have the form FCN (A1, A2, A3) where FCN is the absolute address of the program or function being called and A1-A3 are the various arguments or parameters of the function call. In a wellknown manner the operating system of microprocessor 104 of FIG. 1 receives the function call and the associated arguments and sets its program counter to the address of the program FCN and starts to sequentially execute the instruction of the function program to perform the desired function.

CALL TRANSFER - GENERAL DESCRIPTION

The following description of the operation of the call transfer feature makes joint reference to FIGS. 2, 4 and 5. In the following description the first number of a designation refers to the FIG. number, e.g., 401 refers to FIG. 4. FIG. 4 shows a chart which illustrates the status of the red (R) and green (G) LEDs and the audible signal (A) for one CO line as it appears at each stations ST1 and ST2 during the various states 401-407 used in establishing a call transfer. The red (R) and green (G) LEDs associated with ST6 represent the status of a cover button (representing call coverage for ST2) during the aforementioned call states.

The red LED (R) is associated with each central office line or facility and indicates a preselect or preferred facility for each station. Thus, when the red LED is on it indicates that the associated CO line is currently in use by that station, or this facility will become active when that station goes off-hook. The green LED (G) is also associated with each CO line and indicates line status. When the green LED is off it indicates that the associated CO line is not in use. When the green LED is flashing (F) it indicates that the CO line is ringing or a call has been transferred to another station. When the green LED is fluttering (R) it indicates that a call has been placed on normal or transfer hold (if transfer hold, it indicates that a call has been transferred from one station to another station but has not yet been answered). When the green LED is winking (W) it indicates that the call transfer button has been depressed, at another station, but that the transferee station has not been dialed yet. When the green LED is on steadily (S) it indicates that the CO line has been answered at this or another station set of the system.

Assuming an incoming call on station ST1, then as shown in 401 at station ST1, the green LED is flashing (F), 1.2 sec on 4.0 sec off, and a ringing signal as shown in 501 of FIG. 5 is outputted. The ring signals of FIG. 5 have call origin (504) and call destination (505) segments similar to those described in copending U.S. patent application Ser. No. 443,391, filed by T. H. Judd et al on Nov. 22, 1982, now U.S. Pat. No. 4,477,697. In FIG. 5 the M and X designations indicate different ringing frequencies. In the disclosed embodiment stations ST2 and ST6 output no ringing signal while their green LEDs are flashing. However, it should be noted that station ST2 and ST6 could likewise be made to ring. When a user at station ST1 answers the call, 402, the green LED is in a steady (S) on condition at all stations ST1, ST2 and ST6 (the cover button, however, will revert to idle). With particular reference to FIG. 2, if the user at station ST1 decides to transfer the call to a party at station ST2, the transfer button 202 is pressed and the transferee station destination code, ST2, is pressed on the key pad 203. Note, it is contemplated that a direct station selection arrangement could be utilized whereby pressing one button activates both the call transfer function and selects the transferee station. It is further contemplated that a call transfer can also be initiated by means other than transfer button 202, for example, one or more dialed digits from key pad 203.

With reference to FIG. 4 again, when the transfer button 202 is pressed, state 403, the system places the incoming call on hold and signals the user at station ST1 of this condition by a flutter condition (R), 50 msec on 50 msec off, on the green LED. The green LED at station set ST2 start to wink (W), 350 msec on 50 msec off, during this condition, signaling users at these locations of a possible call transfer. At state 404, the user or transferor at station ST1 completes dialing the number of the transferee station, ST2 in this example. In state 404, there is no change in the visual on the green LED at ST1. At the transferee station ST2, the green LED flashes at the transfer ring rate, 500 msec on 500 msec off, the red LED indicates the button assigned to the transferred call and a transfer ringing signal 502 is outputted. It should be noted that the green LED indication is in distinct and consistent with the particular state of the call transfer. At station ST6, the green LED also flashes but no transfer ring signal is outputted. Assuming a user at station ST2 answers the call, state 405, the transfer ring stops at station ST2 and the green LED goes to a steady (S) on condition as stations ST1 and ST2 while the green LED goes off at station ST6.

In the event that no one answers at station ST2 for a predetermined time, the transfer ring 502 switches from state 404 to the cover ring delay state 406. In state 406 station ST6, previously selected as the cover station for station ST2, would receive, after a predetermined time period, the transfer ring 502 audible signal, which also continues at station ST2.

In the event that there is no answer at either transferee station ST2 or cover station ST6, the no answer ring delay recall state 407 is entered. During this recall of a transferred call, state 407, a return ring signal (503) and a flashing green LED condition is generated for station ST1. At stations ST2 and ST6 the transfer ring audible and the flashing green LED condition would continue. While the return ring signal 503 of FIG. 5 is shown to be identical to that of return ring 503, it is contemplated but not shown that they could be different. Assuming a user at station ST1 answers the call, the recall answer state is extended and the ring signal stops. In state 408, the red and green LEDs go to the steady (S) on condition at station ST1. Meanwhile, at station ST2 the green LED goes steady (S), and at station ST6 both the red and green LEDs go off.

CALL TRANSFER - DETAILED DESCRIPTION

An embodiment of the disclosed call transfer method and arrangement which effectuates the operations described in FIG. 4 is described with reference to FIGS. 1, 3, 6 and 7. In the following description the first number of a command designation refers to the FIG. in which it is located. Using the flow charts of FIGS. 6 and 7 the disclosed call transfer feature can be readily implemented by those skilled in the art.

Assuming that a user has answered a call on CO line 1 at station ST1 (402) and would like to transfer the call to station ST2, the following sequence of communications takes place between the software modules of FIG. 3. For purposes of the following description, commands and program calls can be considered as control signals.

Figure 6:
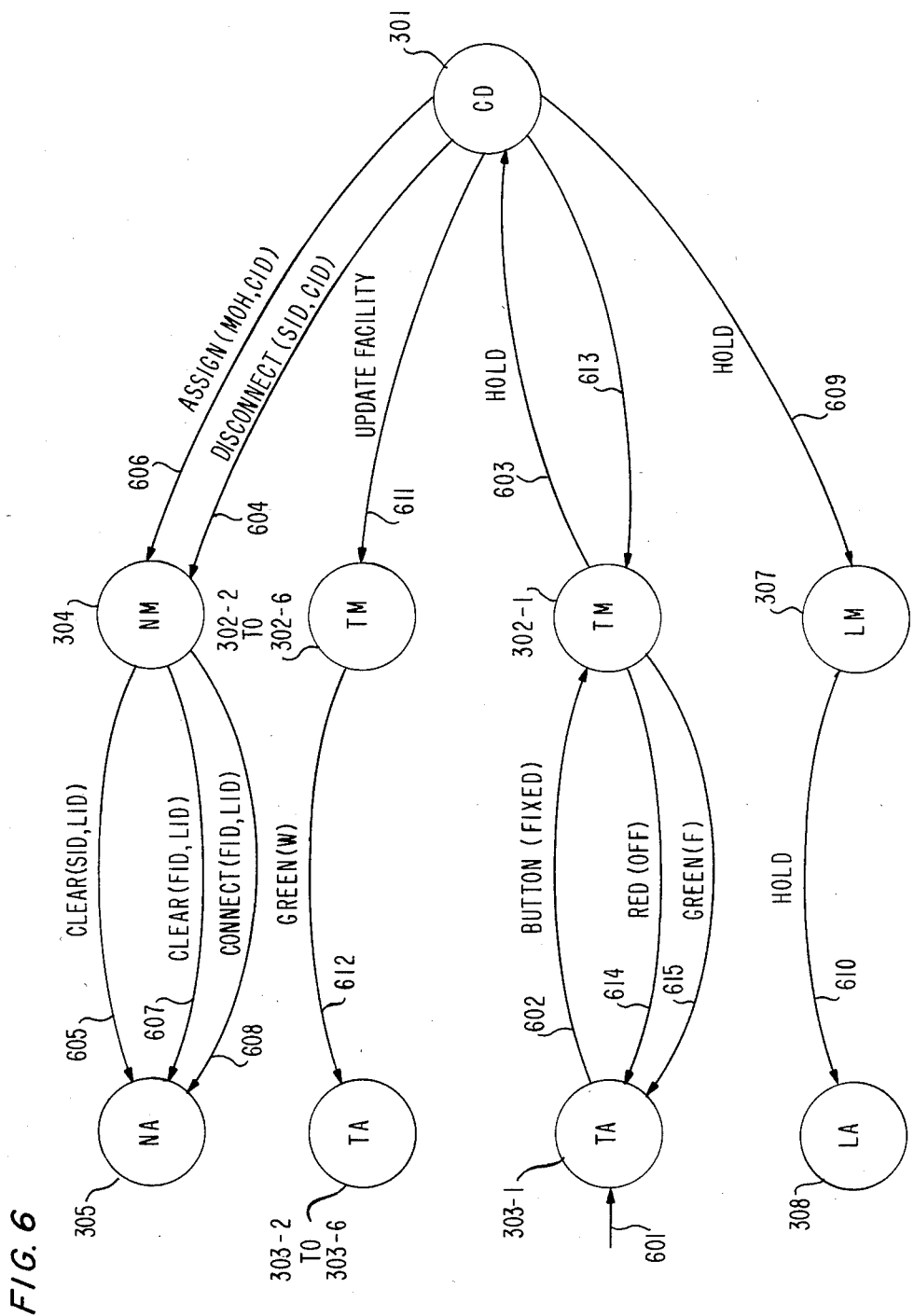
FIG. 6 shows a flow chart which describes the operating command sequence for activating the call transfer feature.

The user at station ST1 initiates the transfer sequence by depressing the transfer button 202 on the station set ST1 (FIG. 2). This button status information is formatted into a data word and transmitted over the control pair to control logic 112 of common controller 100 (FIG. 1). In a well-known manner a foreground program operable in microprocessor 104 receives this message from control logic 102 and enters it into a queue to await processing by a background program associated with terminal adapter 303-1 which services station set ST1. With reference to FIG. 6, there is shown the activation sequence for a call transfer, states 401-403 of FIG. 4.

In FIG. 6 the first step 601 in the sequence of events is that terminal adapter 303-1 determines the message type and if a change in transfer button status has occurred. In our example, i.e., FIG. 4, the transfer button at station ST1 was pressed and a command or program call is made, 602, to identify a fixed button number to the associated terminal manager 302-1 for further processing.

Upon receiving this command, terminal manager 302-1 is programmed to determine the functionality of the button number and validity of the fixed button depression. The terminal manager 202-1 converts the button command into a user function request (in this case, call transfer). Terminal manager 202-1 utilizes station status records and facility status table to determine the validity and the function requested. In response to a transfer button depression at an off-hook station set ST1, terminal manager 302-1 recognizes that a hold function command 603 should be sent to call director 301 to establish a transfer hold condition on the incoming CO line. The hold command 603 has the form HOLD (SID, CID, Type) where argument SID is the station identification, (ST1), CID is the call identification and Type is the code for the type of function requested (call transfer-TNS).

Upon receiving the hold command, call director 301 prepares responses. Call director 301 is programmed to consider call privileges and feature relationships prior to preparing responses to commands. That is, certain programmed restrictions may exist which would prevent implementation of certain call features to certain stations or facilities. Additionally, call director 301 checks resource records such as call linkage, call activity and call allocation. Assuming the call transfer request from station ST1 is a proper one, call director 301 responds as follows. A disconnect command 604 is sent to network manager 304 to remove the initiating station ST1 from the call on CO line 1. The form of this command is Disconnect (SID, CID).

The network manager 304 receives command 604 and responds by issuing a clear station command 605 which identifies the port to network adapter 305. The form of this command 605 is CLEAR (SID, LID). The network manager 304 determines switch 101 network properties and allocates network resources and also keeps switch link records and link assignment status. In response to the command 605 from network manager 304, network adapter 305 responds by releasing the crosspoint associated with the voice connection between station ST1 and CO line 1.

Additionally, call director 301 sends another command 606 to network manager 204 to assign the hold CO line 1 to music-on-hold. This command has the form ASSIGN (MOH, CID) where argument MOH identifies that music from cartridge 111 is to be applied to CO line 1 via interface 113, control logic 102, and switch 101. Network manager 304 responds by issuing the following two commands to network adapter 305.

The first command is a clear port command 607, CLEAR (FID, LID), which causes network adapter 305 to release a link associated crosspoint in switch 101 for the CO line. The second command is a connect port command 608, CONNECT (FID, LID), to activate a crosspoint connection for connecting CO line 1 to the music-on-hold link.

Call director 301 also sends a hold command 609 to line manager 307. This command has the form HOLD (CID, FID, STAT) where argument FID identifies the CO line and STAT identifies the new state of the line, i.e., hold. Note the difference in format between Hold command 603 received by call director 301 and Hold command 609 transmitted by call director 301. The Line manager 307 specifies CO line properties and maintains CO line status tables from received CO line data. The line manager 307 issues a Hold command 610 to line adapter 308 to place the line circuit associated with CO line 1 in the hold condition.

In response to the received Hold command 610, line adapter 308 inhibits the transmit path from CO line 1, maintains CO line 1 loop supervision, and permits the CO line 1 party to receive music-on-hold. Finally, call director 301 issues an Update Facility command 611 to all terminal managers except the initiating terminal manager, i.e., 302-2 through 302-6, to inform them that CO line 1 is in a hold condition. This command has the form UPDATE FACILITY (CID, DSID, FID, STAT) where argument DSID is the destination station identification and STAT identifies the hold condition. Upon receiving the Update Facility command 611, each terminal manager issues the appropriate wink green LED commands 612 to its respective terminal adapters. In response, each terminal adapter updates the visual images associated with the line button assigned to CO line 1. Each terminal adapter causes control logic 102 to generate the proper LED status update message for transmission over the control pair to the respective stations ST2-ST6. This data message describes the new visual status of the green LEDs at each station set to reflect the new condition of CO line 1. This causes, as noted in FIG. 4 at 403, the green LEDs of stations ST2 and ST6 to wink.

Call director 301 also returns a parameter 613 to the initiating terminal manager 302-1 indicating that the transfer command request has been successfully executed. The initiating terminal manager 302-1 commands, 614 and 615, the associated terminal adapter 303-1 to display the new call status. Terminal adapter 303-1 causes an LED status update message to be generated by control logic 102 for transmission to station ST1. This message causes the green LED associated with the CO line 1 button to flutter (see 403 of FIG. 4), indicating an IHold call. This message also causes the red LED associated with the line button (indicating the I-use function) to be extinguished, i.e., station ST1 is not using CO line 1.

After the user has pressed the transfer button on station ST1, 403, the user completes the call transfer sequence by dialing the address of the destination station, 404, ST2 in our example. This destination station information message is transmitted over the control pair from station ST1 to controller 100. The foreground processor of microprocessor 104 removes this message from control logic 102 and enters it into a queue to await processing by a background task program associated with terminal adapter 303-1.

Figure 7:
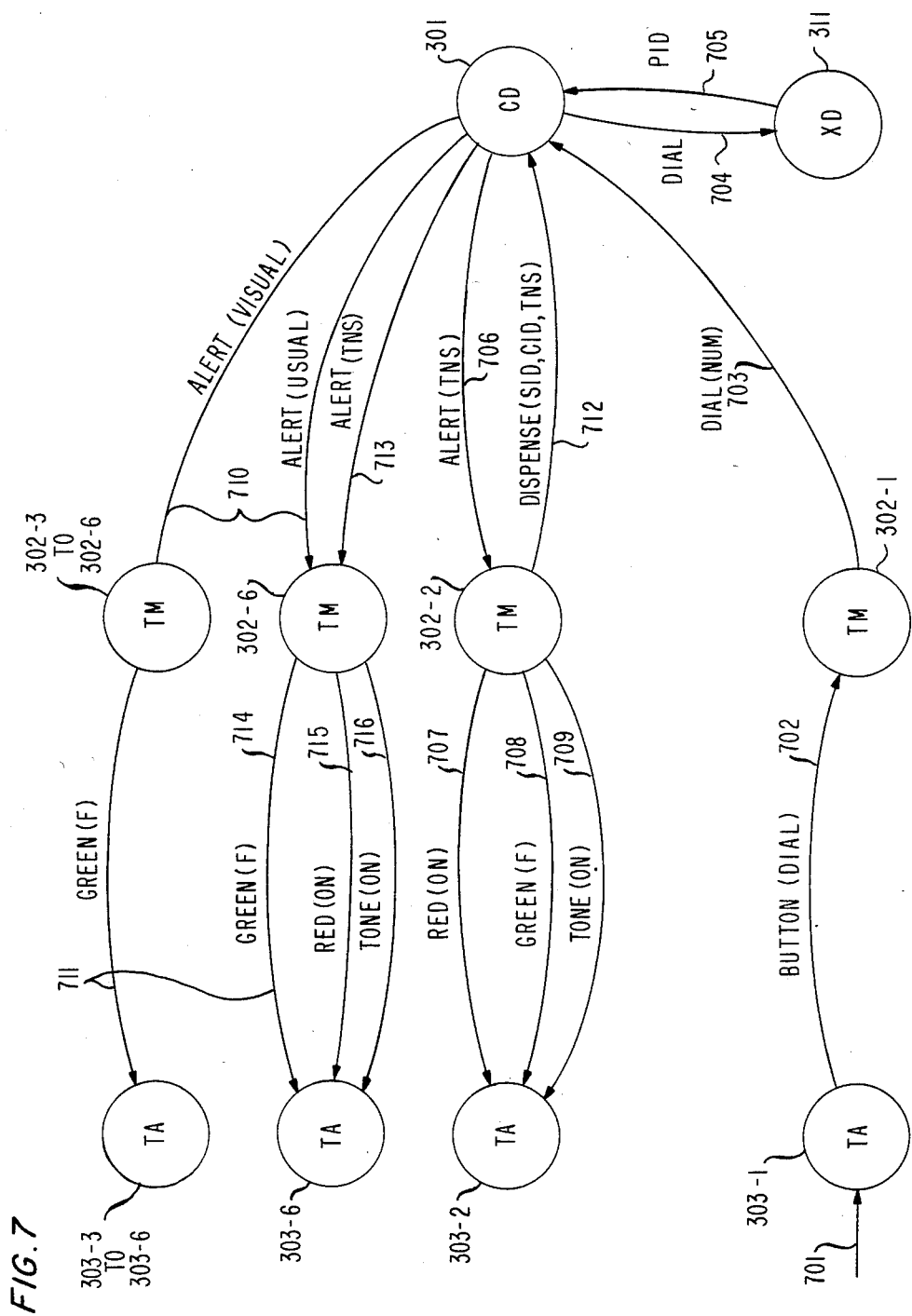
FIG. 7 shows a flow chart which describes the operating command sequence for invoking the call transfer feature.

The following description refers jointly to FIGS. 1, 4 and 7. FIG. 7 illustrates the sequence of the invocation sequence of a call transfer, state 404 of FIG. 4. In FIG. 7, when 303-1 terminal adapter receives the button depression message 701 from control logic 103 it compares the button depression against a button status table. Since a change in button status occurred at station ST1, i.e., user had dialed the destination station address ST2, terminal adapter 303-1 sends a Button command 702 to terminal manager 302-1, identifying the dialed button number.

Terminal manager 302-1 receives command 702 and determines the functionality and validity of the button depressions. That is, since terminal manager 302-1 knows that station ST1 previously entered the call transfer mode, the button depressions are checked to see that they are consistent for the call transfer mode. Thereafter, terminal manager 302-1 sends a Dial command 703 to call director 301. This command has the format, DIAL (SID, CID, NUM) where the argument NUM is the dial character dialed by station ST1. Note each digit (of the Listed Station Directory Number) of the dialed number is transferred in a separate command to call director 301.

Upon receiving the DIAL command 703, call director 301 passes the dial information to translation director 311 with a DIAL PLAN (SID, CID, NUM) command 704. Translation director 311 includes tables for converting station and call numbers into the logical addresses of the station port (equipment number). Translation director 311 responds with the logic addresses 705 of the switch port, PID, of the transfer destination. Upon receiving the destination logical address, the call director 301 initiates the following commands. First a command 706, ALERT (TNS), is sent to the destination terminal manager 302-2 (the terminal manager for call transfer destination station ST2) to indicate the arrival of a transferred call. The actual format of command 706 is ALERT (CID, DSID, SID, FID, TYPE), where the argument TYPE indicates that a transferring signal should alert the transferee station ST2. In response to command 706 terminal manager 302-2 issues command 707, RED (ON), to terminal adapter 303-2 to turn on at station ST2, the red LED of the button associated with the transferred line, i.e., CO line 1. (See state 404 of FIG. 4 for station ST2). Additionally, terminal manager 302-2 issues a command 708, GREEN (F), to flash, at station ST2, the facility status visual, the green LED, associated with the transferred line. As previously noted, terminal adapter 303-2 generates the messages which are transmitted via control logic 102 and switch 101 to station ST2 which causes the red and green LEDs to operate. Finally, a command 709, TONE (TNS) is sent to terminal adapter 303-2 to generate an audible transfer ring signal (502 of FIG. 5) for station set ST2 to signify the arrival of a transferred call.

Call director 301 also sends an ALERT (VISUAL) command 710 to the remaining terminal manager 302-3 through 302-6 (but not terminal manager 302-1 of the initiating station ST1) to inform those managers of the change in facility call status. In response, each of the remaining terminal managers 302-3 through 302-6 send a GREEN (F) command 711 to their respective terminal adapters 303-3 through 303-6 to flash the facility status visual, green LED, of the button assigned to the facility CO line 1 (see state 404 of FIG. 4 for station ST6) to indicate that call transfer is in progress.

The respective terminal adapters 303-3 through 303-6 generate the message which is transmitted via control logic 102, switch 101, and control pair to stations ST3 through ST6. The station sets decode the message and cause the green LED thereon to flash. Thus, at this point the audible and visual at station sets ST1, ST2, ST6 would appear as shown in state 404 of FIG. 4.

If the call is unanswered for a predetermined period of time, as in state 406 of FIG. 4, then TM issues a DISPENSE (SID, CID, TNS) command 712, causing call director 301 to alert a third station ST6 with a transfer ring signal. As previously noted, station ST6 was selected by the user to cover calls to station ST2. Station ST6 is alerted using command 713 of FIG. 7 issued by call detector 301. This cover (third) station ALERT command, 713, is addressed to the terminal manager 302-6 of cover station ST6. This cover station alert command is sent to terminal manager 302-6 which generates commands 714, 715, and 716 which causes, respectively, a flashing green LED, a steady "on" red LED, and a transfer ring signal at station ST6. These commands are equivalent to 707, 708, and 709 but addressed to terminal adapter 303-6. The resulting audible and visual signals at station ST6 are shown by state 406 of FIG. 4. Note that during state 406 the audible and visual signals at station ST2 remain unchanged from state 404 and are identical to those of station ST6. However, if desirable the cover station alert command 713 could, in a manner similar to that already described, be made to remove the transfer ring signal at station set ST2 when the transfer ring signal is added to station set ST6.

Figure 8:
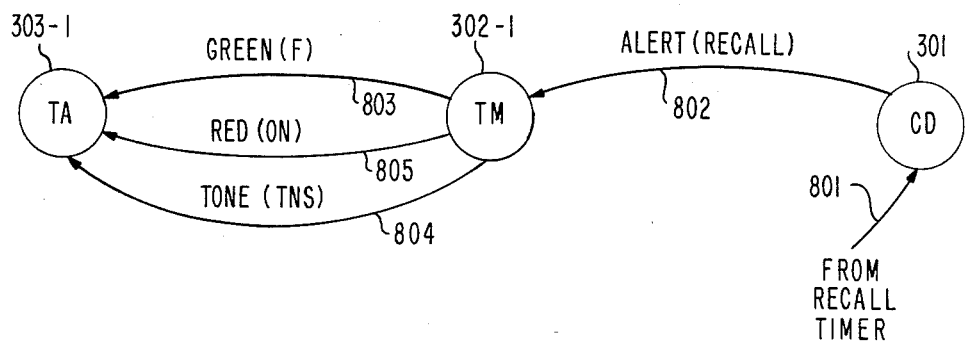
FIG. 8 shows a flow chart which describes the operating command sequence for a recall of a transferred call.

With reference to FIG. 8, in the event the call is not answered, at station ST2, ST6, or other stations of the system, after a predetermined time period, recall timer 801 signals call director 301. Call director 301 sends to terminal manager 302-1 a station recall alert command 802, ALERT (RECALL), which includes arguments CID, DSID, SID, FID, and REC. Argument REC indicates that a transfer recall is requested to return the call to the originating station SID. Terminal manager 302-1 sends commands 803, 804, and 805 to terminal adapter 303-1 to, respectively, flash the green LED, generate a recall tone (a return ring signal, 503 of FIG. 5), and turn on the red LED at station ST1. Again, terminal adapter 303-1 generates the appropriate messages for control logic 102 which are sent over the control pair to station ST1. The resulting audibles and visual signals at the stations are shown by the recall answer state 407 of FIG. 4.

Figure 9:
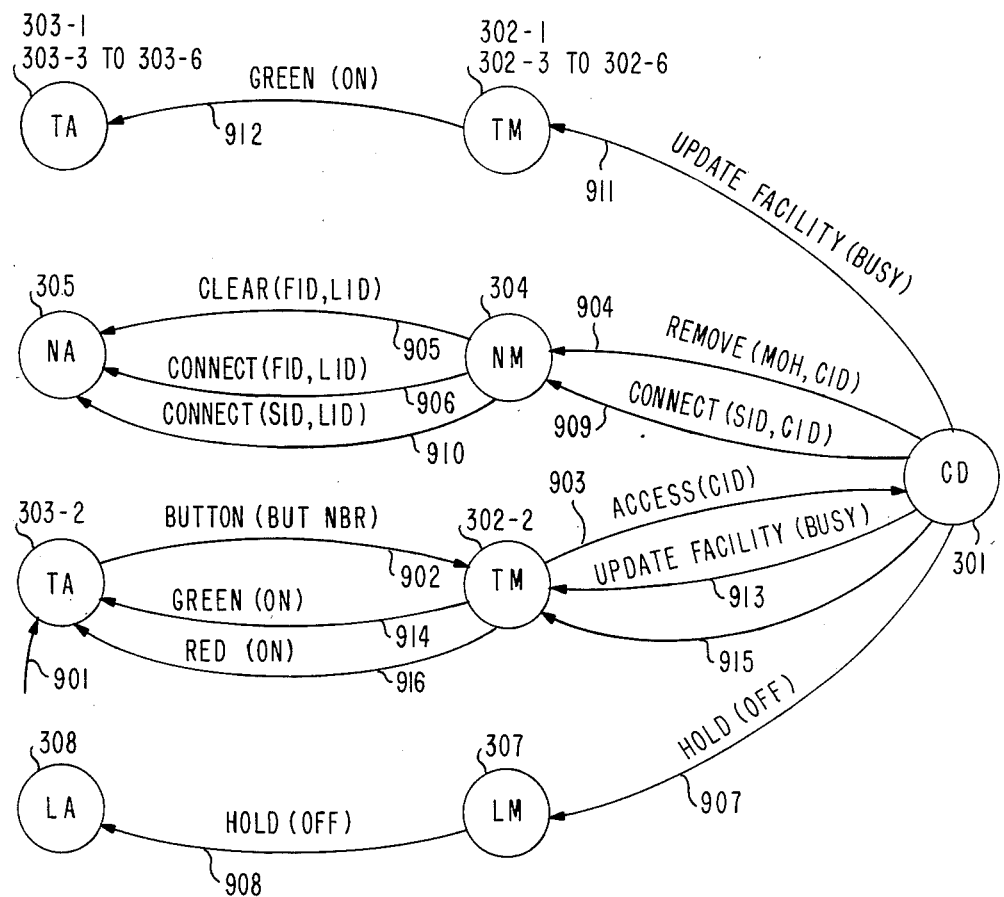
FIG. 9 shows a flow chart which describes the operating command sequence for answering a transferred call.

The following description makes joint reference to FIGS. 4 and 9. When an incoming call has been transferred to station ST2 from station ST1, the audibles and visuals signals appear as shown by state 404 of FIG. 4. When this call is answered at station ST2 the following sequence occurs to cause the audibles and visual signals to appear as shown by 405 of FIG. 4.

When an off-hook condition is detected at station ST2 this status is reported in a data transmission over the control pair to control logic 102. After decoding the message, control logic transfers, 901, the information to terminal adapter 303-2 which sends a button status message 902, BUTTON (BUT NBR), to terminal manager 302-2. Thereafter, terminal manager sends command 903, ACCESS (SID, FID, CID), to call director 301 identifying that station ST2 wants access to the call on CO line 1. Call director 301 sends to network manager 304 command 904, REMOVE (MOH, CID), where argument MOH identifies the resource, music-on-hold, to be removed from call (CID). Network manager 304 sends command 905, CLEAR (FID, LID) to remove CO line 1 from the music-on-hold facility. Network manager 304 also sends command 906, CONNECT (FID, LID) to connect CO line 1 to the original communicating link.

Thereafter, call director 301 sends to line manager 307 command 907, HOLD (CID, FID, STAT) where STAT indicates that the hold condition is to be removed or taken off from call (CID) and CO line 1 (FID). Line manager 307 sends command 908 HOLD (OFF) to line adapter 308 to remove the hold condition.

Call director then sends to network manager 302-2 command 909, CONNECT (SID, CID), identifying that station ST2 (SID) is to be connected to the call (CID) which is on CO line 1. Network manager 304 sends command 910, CONNECT (SID, LID) to network adapter 305 to accomplish the connection. Call director 301 sends to terminal managers 302-1, 302-3 through 302-6 command 911, UPDATE FACILITY (CID, DSID, FID, STAT) where the status STAT is to be changed to the busy condition at stations ST1, ST3 through ST6. Terminal managers 302-1, 302-3 through 302-6 each send command 912, GREEN (ON), to their respective terminal adapters 303-1, 303-3 through 303-6. Similarly, call director 301 also sends an update facility command, 913, to terminal manager 302-2 which sends a command 914 to terminal adapter 303-2 to turn the green LED on at station ST2. Call director 301 also returns a parameter 915 to the initiating terminal manager 302-2 indicating that the ACCESS command 903 has been successfully executed. Terminal manager 302-2 then sends command 916 to terminal adapter 303-2 to turn-on the red LED at station set ST2. Finally, terminal adapter 303-2 carries out the command in the previously described manner to enable the audible and visual signals to appear as shown in 405 of FIG. 4.

What has been described is merely illustrative of our invention, other embodiments known to those skilled in the art could be utilized without departing from the spirit and scope of the present invention. For example, other arrangements of audible or visual alerting signals or tones associated with the various feature steps can be utilized without deviating from our invention. Additionally, other applications to telephone or other communication systems other than the disclosed system are contemplated as being within the knowledge of one skilled in the art.

What is claimed is:

1. A call transfer circuit for use in a telephone communication system having a plurality of station sets for answering a telephone call in response to a received call ring signal, said circuit comprising
   means responsive to a transfer signal from a first station set for transferring to a second station set a call previously answered at said first station set, and
   means responsive to the operation of said transferring means for generating during the answered call a transfer ring signal for said second station set which is different from said received call ring signal.

2. The call transfer circuit of claim 1 including
   means responsive to a transferred call which has not been answered within a predetermined time period for generating a dispense command and
   wherein said transfer signal generating means is responsive to said dispense command for generating a transfer ring signal at a third station set.

3. The call transfer circuit of claim 1 further including
   means responsive to a transferred call which has not been answered within a second predetermined time period for generating a station recall alert command and
   wherein said transfer signal generating means is responsive to said station recall command for generating a return ring signal at said first station.

4. The call transfer circuit of claim 3 wherein said transfer signal generating means is responsive to said station recall command for removing said transfer ring signal from said third station set.

5. The call transfer circuit of claim 1 wherein each of said plurality of station sets includes a call transfer means for generating said transfer signal and a dialing means for selecting a call transfer station.

6. The call transfer circuit of claim 1 wherein each of said plurality of station sets includes a visual indicator for indicating call status, said call transfer circuit including
   means responsive to said call transferring means for generating a visual indication at said second station which is different from the visual indication at said first station.

7. The call transfer circuit of claim 6 wherein each of said plurality of station sets includes a call transfer means for generating said transfer signal and a dialing means for selecting a call transfer station and wherein said visual indication generating means generates
   a first different visual indication at said second station in response to said call transfer signal and
   a second different visual indication at said second station in response to a completion of signals from said dialing means.

8. A call transfer method for use in a telephone communication system having a plurality of station sets for answering a telephone call in response to a received call ring signal, said method comprising the steps of:
   transferring an answered call from a first station set to a second station set in response to a transfer signal from said first station set, and
   generating during said answered call and in response to said transfer signal a transfer ring signal for said second station set which is different from said received call ring signal at said first station set.

9. The call transfer method of claim 8 including the steps of
    generating a dispense command in response to a transferred call which has not been answered within a predetermined time period, and
    generating a transfer ring signal at a third station set in response to said dispense command.

10. The call transfer method of claim 8 including the steps of:
    generating a first station recall alert command in response to a transferred call which has not been answered within a second predetermined time period, and
    generating a return ring signal at said first station in response to said first station recall command.

11. The call transfer method of claim 8 wherein each of said plurality of station sets includes a visual indicator for indicating call status, said call transfer method including the step of:
    generating in response to a transferred call a visual indication at said second station which is different from the visual indication at said first station.

* * * * *

UNITED STATES PATENT AND TRADEMARK OFFICE
CERTIFICATE OF CORRECTION

PATENT NO. : 4,560,837
DATED : December 24, 1985
INVENTOR(S) : Robert A. Carson, Francis M. Fenton, David F. Jones It is certified that error appears in the above-identified patent and that said Letters Patent is hereby corrected as shown below:

Column 6, line 41, "is in distinct" should read --is distinct--.

Signed and Sealed this

Twenty-fifth Day of March 1986

[SEAL]

Attest:

DONALD J. QUIGG

Attesting Officer

Commissioner of Patents and Trademarks